(12) United States Patent
Shirai et al.

(10) Patent No.: US 10,160,056 B2
(45) Date of Patent: Dec. 25, 2018

(54) ARC WELDING EQUIPMENT

(71) Applicant: DENSO CORPORATION, Kariya, Aichi-pref. (JP)

(72) Inventors: Hideaki Shirai, Kariya (JP); Tsuyoshi Hayakawa, Kariya (JP); Yuusuke Kataoka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 55 days.

(21) Appl. No.: 15/524,029

(22) PCT Filed: Nov. 5, 2015

(86) PCT No.: PCT/JP2015/081196
§ 371 (c)(1),
(2) Date: May 3, 2017

(87) PCT Pub. No.: WO2016/072459
PCT Pub. Date: May 12, 2016

(65) Prior Publication Data
US 2017/0326676 A1 Nov. 16, 2017

(30) Foreign Application Priority Data
Nov. 5, 2014 (JP) .................................. 2014-225117

(51) Int. Cl.
*B23K 10/00* (2006.01)
*B23K 10/02* (2006.01)
(Continued)

(52) U.S. Cl.
CPC ............ *B23K 10/02* (2013.01); *B23K 9/1006* (2013.01); *B23K 9/167* (2013.01); *B23K 9/28* (2013.01);
(Continued)

(58) Field of Classification Search
CPC ........ B23K 10/02; B23K 9/1006; B23K 9/67; B23K 9/28; B23K 9/296; B23K 9/324;
(Continued)

(56) References Cited

U.S. PATENT DOCUMENTS 5,220,246 A 6/1993 Ide et al.
2014/0113527 A1* 4/2014 Lindsay .................. B23K 5/00
451/5

(Continued)

FOREIGN PATENT DOCUMENTS

JP H01-254100 A 10/1989
JP H05-337647 A 12/1993
(Continued)

*Primary Examiner* — Mark Paschall
(74) *Attorney, Agent, or Firm* — Harness, Dickey & Pierce, P.L.C.

(57) ABSTRACT

Arc welding equipment for joining the objects at high speed and for reducing the strain of the objects after being joined is provided. The nozzle housing an electrode forming arc plasma is formed from a gas supply part and a gas suction part. The gas supply part has gas supply holes supplying gas outward in a radial direction of the arc plasma. The gas suction part suctions the gas supplied form the gas supply part. A pair of the gas supply holes, which are disposed so that the electrode is disposed therebetween, supply the gas of a first pressure to a position away from the electrode by a first distance. A pair of the gas supply holes, which are disposed so that the electrode is disposed therebetween other than the pair of the gas supply holes, supply the gas of a second pressure to a position away from the electrode by a second distance. The second distance is longer than the first distance. The gas of the second pressure is lower than that of the first pressure. Thereby, the arc plasma is compressed in a direction connecting the gas supply holes, and the arc plasma becomes long in a direction connecting the gas supply holes.

5 Claims, 5 Drawing Sheets

(51) Int. Cl.
  *B23K 9/10*    (2006.01)
  *B23K 9/28*    (2006.01)
  *B23K 9/32*    (2006.01)
  *B23K 9/167*   (2006.01)
  *B23K 9/29*    (2006.01)
  *B23K 37/02*   (2006.01)
(52) U.S. Cl.
  CPC .............. *B23K 9/296* (2013.01); *B23K 9/324* (2013.01); *B23K 9/325* (2013.01); *B23K 10/006* (2013.01); *B23K 37/0235* (2013.01)
(58) Field of Classification Search
  CPC ........ B23K 9/325; B23K 10/006; H05H 1/26; H05H 1/36
  USPC ............. 219/137 R, 121.45, 121.46, 121.59, 219/121.54, 121.51, 121.55
  See application file for complete search history.

(56) References Cited

U.S. PATENT DOCUMENTS

2015/0127137 A1\* 5/2015 Brandt ..................... B23K 5/00
                                                700/166
2018/0015561 A1\* 1/2018 Kawabe ................ B23K 9/173

FOREIGN PATENT DOCUMENTS

| JP | H08-267250 A | 10/1996 |
| JP | H11-241168 A | 9/1999 |
| JP | 2003-053453 A | 2/2003 |
| JP | 2006-051521 A | 2/2006 |

\* cited by examiner

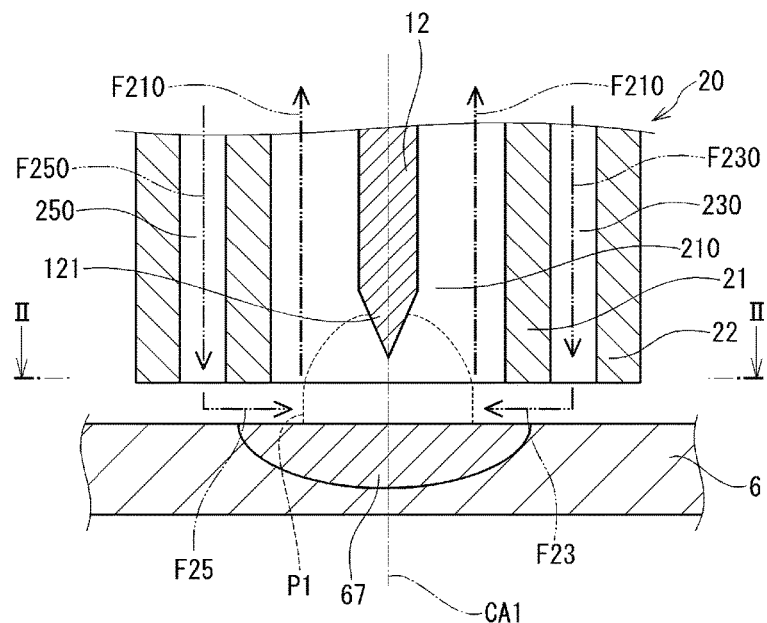
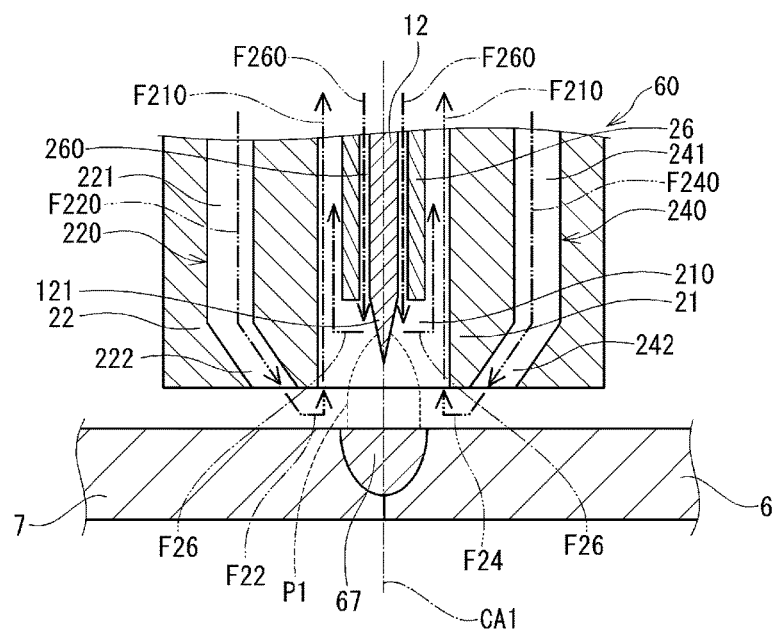

ARC WELDING EQUIPMENT

CROSS REFERENCE TO RELATED APPLICATIONS

This application is a U.S. National Phase Application under 35 U.S.C. 371 of International Application No. PCT/JP2015/081196 filed on Nov. 5, 2015 and published in Japanese as WO 2016/072459 A1 on May 12, 2016. This application is based on and claims the benefit of priority from Japanese Patent Application No. 2014-225117 filed on Nov. 5, 2014. The entire disclosures of all of the above applications are incorporated herein by reference.

BACKGROUND OF THE INVENTION

Technical Field

This disclosure relates to arc welding equipment for arc welding two objects to be joined.

Background Art

There is known arc welding equipment for arc welding two objects to be joined using an arc current. An electrode is disposed at a vicinity of a part where the two objects contact. The electrode and a group of the two objects are supplied with an electric power from the arc welding equipment so that polarities thereof are respectively different. The arc current flows between the electrode and the group of the two objects. For example, in patent document 1, arc welding equipment for stabilizing arc plasma is described. The arc welding equipment is provided with an electrode having welding gas supply holes, which may supply a welding gas between a group of the two objects and the electrode. The welding gas may form the arc plasma using an arc current.

Patent Document 1 Japanese Unexamined Patent Application No. 2006-51521.

In general, the energy density of the arc plasma in arc welding is relatively low such as approximately 100 to 1000 W/mm2. Thus, in arc welding, a melting width at two objects to be joined is broad and a penetration depth at the two objects is shallow. The arc welding is this process having a low aspect ratio. Therefore, strain on a joint between the two objects easily increase, and it is also difficult to perform processing at high speed. On the other hand, laser welding at an energy density of approximately 10000 to 1000000 W/mm2 is used to reduce the strain and to increase the processing speed. However, there is a problem that laser welding equipment is expensive, and therefore, processing cost is increased.

SUMMARY

Hence it is desired to provide the arc welding equipment for joining the two objects at high speed and for reducing the strain on the joint after being joined.

Arc welding equipment for welding two objects to be joined of the present disclosure is provided with an electrode, a gas supply part, a gas suction part and a gas storage part.

The electrode is disposed at a vicinity of a part where the two objects contact. Arc plasma is formed between the part where the two objects contact and the electrode.

The gas supply part is disposed outside in a radial direction of the electrode, and has a plurality of gas supply holes supplying a gas outward in a radial direction of the arc plasma.

The gas suction part is disposed between a plurality of the gas supply parts and the electrode. The gas supply part supplies the gas outward in the radial direction of the arc plasma between the part where the two objects to be joined contact and the electrode. The gas suction part has a gas suction hole for suctioning the gas.

The power supply part is electrically connected with the electrode. The electrode, and a group of the two objects, are supplied with electric power from the power supply part so that polarities thereof are respectively different.

The gas storage part stores the gas supplied from the gas supply part outward in the radial direction of the arc plasma.

In the arc welding equipment of the present disclosure, one pair of the gas supply holes are formed at a position away from the electrode by a first distance so as to dispose the electrode therebetween. The other pair of the gas supply holes are formed at a position away from the electrode by a second distance so as to dispose the electrode therebetween other than the pair of the gas supply holes. The second distance is longer than the first distance. In addition, in the welding equipment of the present disclosure, the pair of the gas supply holes supply the gas of a first pressure outward in the radial direction of the arc plasma. The pair of the gas supply parts supply the gas of a second pressure outward in the radial direction of the arc plasma so as to dispose the electrode therebetween other than the pair of the gas supply parts. The second pressure is lower than the first pressure.

In the arc welding equipment, the gas supply part supplies the gas outward in the radial direction of the arc plasma generated using an arc current. The arc plasma is disposed between the electrode and the part where the two objects to be joined contact. The gas supplied outward in the radial direction of the arc plasma is suctioned to a radially inner direction of the arc plasma using the gas suction part. The gas suction part is disposed between the gas supply part and the electrode. Therefore, a flow of the gas from a radially outer direction of the arc plasma to the radially inner direction of the arc plasma is formed outside in the radial direction of the arc plasma. A shape of the arc plasma may be freely changed using the flow of the gas.

Furthermore, in the arc welding equipment of the present disclosure, one pair of the gas supply holes supply the gas of a first pressure outward in the radial direction of the arc plasma with the electrode disposed therebetween. On the other hand, the other pair of the gas supply holes are formed at the position away from the electrode by the second distance, which is longer than the first distance. In addition, the pair of the gas supply holes supply the gas of the second pressure, which is lower than the first pressure, outward in the radial direction of the arc plasma. Thereby, the arc plasma is compressed in a direction connecting the pair of the gas supply holes. Therefore, in the direction connecting the pair of the gas supply holes, an energy density of the arc plasma may be increased. In addition, a melting width is narrow and the penetration depth is deep. This arc welding process has a high aspect ratio. In addition, apart from the pair of the gas supply holes, the length in the direction connecting the pair of the gas supply holes provided so as to sandwich the electrode is longer than the length in the direction connecting another pair of the gas supply holes. When the two objects are arc welded in the direction connecting the pair of the gas supply holes extending the arc plasma, a relatively wide range of the two objects may be welded in a short time.

Thus, the arc welding equipment of the present disclosure may produce a weld having the high aspect ratio, narrow melt width and deep penetration for the relatively wide range of the two objects in the short time using the flow of the gas. The gas flows from the radially outer direction of the arc plasma to the radially inner direction of the arc plasma. Thereby, the arc welding equipment of the present disclosure may join the two objects at high speed and may reduce the strain of the two objects after being joined.

BRIEF DESCRIPTION OF DRAWINGS

FIG. 5 shows an enlarged cross section taken along V-V part in FIG. 2;

FIG. 6 shows a sectional view of a nozzle provided in arc welding equipment according to a second embodiment of the present disclosure;

DETAILED DESCRIPTION OF THE PREFERRED EMBODIMENTS

Figure 1:
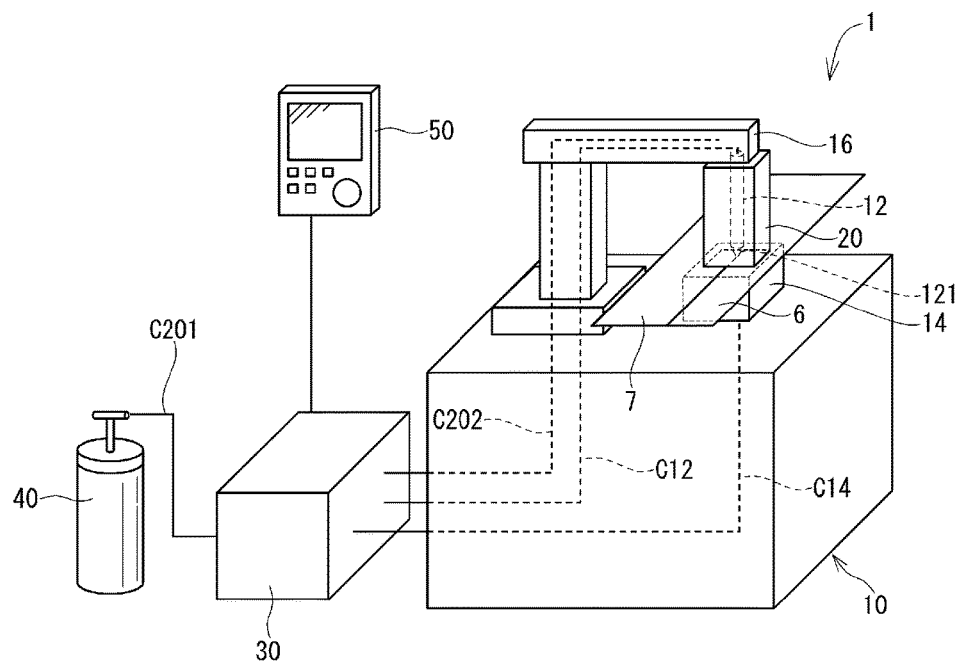
FIG. 1 shows a schematic diagram of arc welding equipment according to a first embodiment of the present disclosure.

A plurality of embodiments of the present disclosure will be described below based on the drawings.

First Embodiment

Arc welding equipment according to a first embodiment of the present disclosure is described below based on FIGS. 1 to 5.

Arc welding equipment 1 according to the first embodiment is an equipment for joining objects 6 and 7 by arc-welding. The arc welding equipment 1 is, as shown in FIG. 1, made up of a welding part 10, power source 30 as "a power supply part", gas storage part 40 and control part 50.

An arc current flows between the objects 6 and 7 from the welding part 10, which is connected with the objects 6 and 7 via a potential adding unit 14. Thereby, the objects 6 and 7 are arc welded. The welding part 10 has an electrode 12, the potential adding unit 14, a nozzle 20 as "a gas supply part" and "a gas suction part" and an electrode supporting part 16.

The electrode 12 is, as shown in FIG. 1, housed in the nozzle 20. The electrode 12 is disposed at a vicinity of a part where the objects 6 and 7 contact. The electrode 12 is electrically connected with the power source 30 via the electrode supporting part 16 (a connecting wiring C12 in FIG. 1).

The potential adding unit 14 is on an opposite side of the part where the objects 6 and 7 contact than the electrode 12. The potential adding unit 14 is electrically connected with the power source 30 (a connecting wiring C14 in FIG. 1). In addition, the potential adding unit 14 is electrically connected with the objects 6 and 7. The potential adding unit 14 supplies a current to the two objects 6 and 7 so that polarities of the electrode 12 and a group of the objects 6 and 7 are respectively different. Thereby, the arc current flows between the electrode 12 and the group of the objects 6 and 7, and an arc plasma P1 is formed (refer to FIGS. 2 to 5).

The nozzle 20 and the electrode 12 are supported by the electrode supporting part 16. The nozzle 20 is connected with the gas storage part 40 via the power source 30 (connecting wirings C201 and C202 in FIG. 1). The nozzle 20 supplies a gas outward in a radial direction of the arc plasma P1 disposed between the electrode 12 and the part where the objects 6 and 7 contact. In addition, the nozzle 20 also suctions the gas. A detail configuration of the nozzle 20 is described later.

The electrode supporting part 16 supports the electrode 12 and the nozzle 20 so that one end part 121 of the electrode 12 is disposed at a vicinity of the part where the objects 6 and 7 contact.

The power source 30 is electrically connected with the electrode 12 and the potential adding unit 14. The electrode 12 and the potential adding unit 14 are supplied the current from the power source 30 so that polarities thereof are respectively different depending on commands from the control part 50.

The gas storage part 40 storages a gas supplied from the nozzle 20 outward in the radial direction of the arc plasma P1, which is, for example, a mixed gas of hydrogen applied in helium or argon or the like. The gas stored in the gas storage section 40 is supplied to the nozzle 20 via the power source 30 and the connection pipings C201 and C202.

The control part 50 is made up of a button for input operation, a display for displaying a setup condition, and a microcomputer with a ROM and a RAM as a storage means. The control part 50 is electrically connected with the power source 30. The control part 50 outputs, for example, a signal, for controlling the arc welding equipment 1, to the power source 30 based on a previously inputted program. In the power source 30, the current supplied to the electrode 12 and the potential adding unit 14 and a pressure of the gas supplied from the nozzle 20 are controlled based on the signal.

Figure 2:
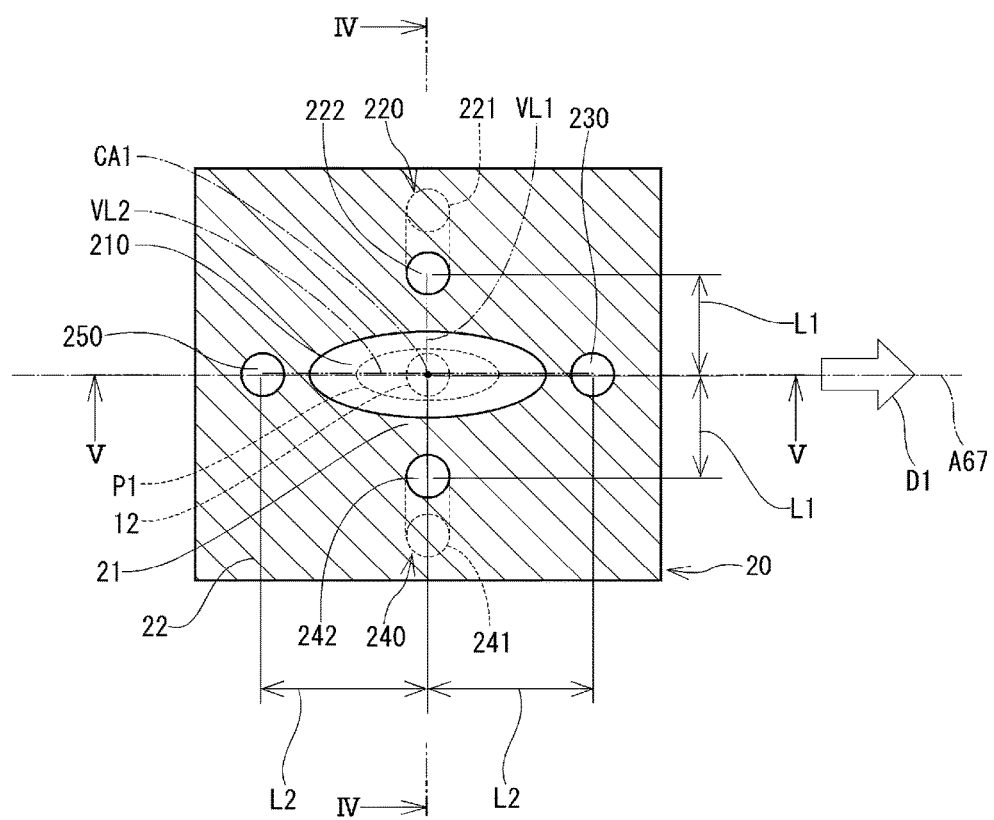
FIG. 2 shows a sectional view of a nozzle provided in the arc welding equipment according to the first embodiment.
Figure 3:
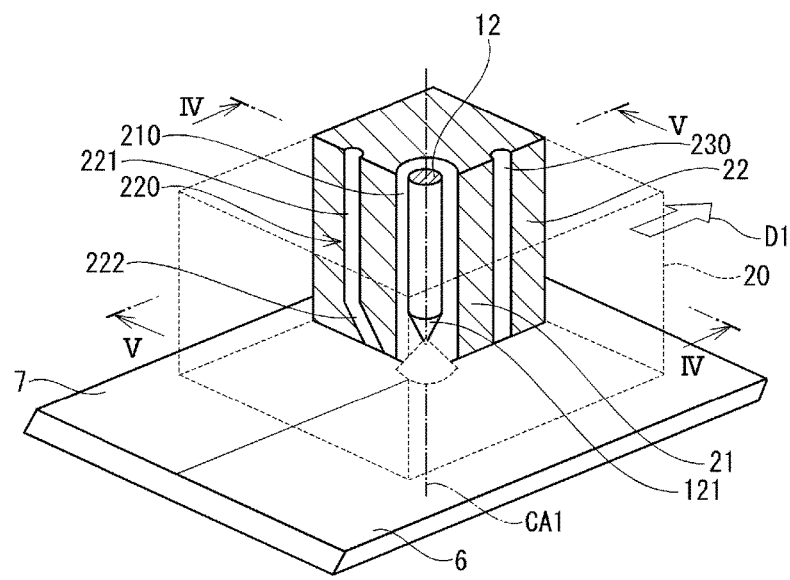
FIG. 3 shows a perspective view of the nozzle provided in the arc welding equipment according to the first embodiment.

Next, a configuration of the nozzle 20 is described in detail based on FIGS. 2 to 5. FIG. 2 is a sectional view of the nozzle 20 in a direction perpendicular to a center axis CA1 of the nozzle 20. The sectional view is a sectional view when observed from a flow direction of the gas in the nozzle 20 to the objects 6 and 7 in the nozzle 20. FIG. 3 is a perspective view of the nozzle 20. FIG. 3 is a sectional view of a part of the nozzle 20. Specifically, FIG. 3 is the sectional view of a part corresponding a quarter of the nozzle 20. In the arc welding equipment 1, a direction in which the objects 6 and 7 move as a welding line direction D1 is indicated by empty arrows in FIGS. 2 and 3.

The nozzle 20 has an approximately parallelepiped member. The nozzle 20 is made up of a gas suction part 21, a gas supply part 22 or the like. In the first embodiment, the gas suction part 21 is formed integrally with the gas supply part 22.

The gas suction part 21 is mounted at an approximately center part of the nozzle 20. The gas suction part 21 has a gas suction hole 210. The electrode 12 is housed in the gas suction hole 210. The gas suction hole 210 suctions the gas disposed at a vicinity of the arc plasma P1 as shown by a dotted line arrow F210 in FIGS. 4 to 5.

The gas supply part 22 is mounted on an outside of the gas suction part 21 so as to surround the gas suction part 21. The gas supply part 22 has gas supply holes 220, 230, 240 and 250.

The gas supply holes 220 and 240 among the gas supply holes 220, 230, 240 and 250 are formed so that the electrode 12 is disposed therebetween. Specifically, as shown in FIG. 2, a virtual line extending in the welding line direction D1 via the center axis is a moving axis A67 of the objects 6 and 7 via the center axis CA1. A point on the center axis CA1 is hereinafter referred to as a point A. A virtual line VL1 of connecting the gas supply hole 220 and the gas supply hole 240 via the point A coaxial with a center axis of the electrode 12, is a first virtual line VL1. The gas supply holes 220 and 240 are formed so that the moving axis A67 is perpendicularly crossed with the first virtual line VL1 on the center axis CA1. In addition, a distance from the gas supply hole 220 to the point A and a distance from the gas supply hole 240 to the point A are the same and are respective first distances L1.

Figure 4:
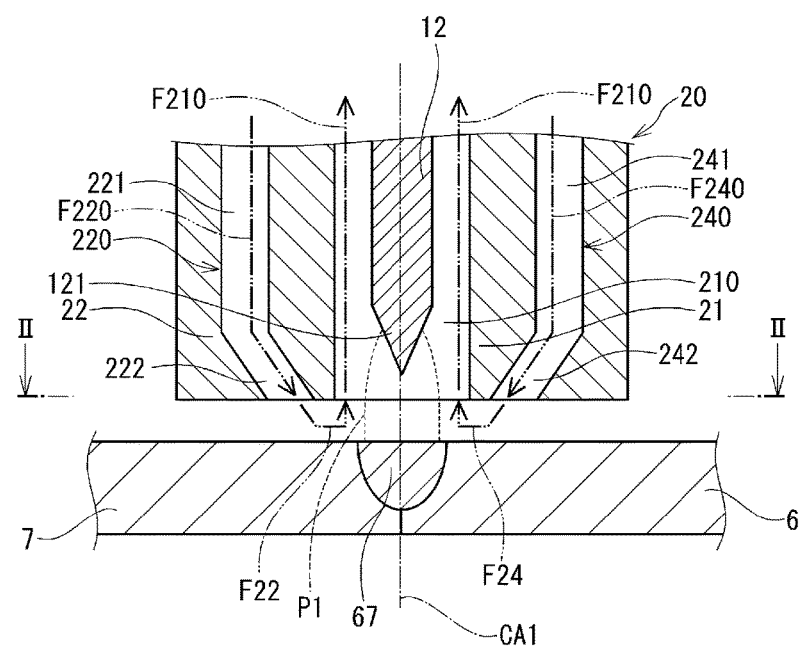
FIG. 4 shows a cross section taken along line IV-IV in FIG. 2.

The gas supply holes 220 and 240 are, as shown in FIG. 4, respectively made up of second gas supply holes 222 and 242. The second gas supply holes 222 and 242 become closer to the electrode 12 as it gets closer to first gas supply holes 221 and 241 and the objects 6 and 7. The first gas supply holes 221 and 241 are formed parallel to the center axis CA1. Each of the gas supply holes 220 and 240 supplies the gas of a first pressure outward in the radial direction of the arc plasma P1 as shown by dotted line arrows F 220 and F240 in FIG. 4. The gas supply holes 220 and 240 correspond to "a pair of gas supply holes" described in claims.

The gas supply holes 230 and 250 are formed so that the electrode 12 is disposed therebetween. Specifically, as shown in FIG. 2, a virtual line connecting the gas supply hole 230 and the gas supply hole 250 via the point A is a second virtual line VL2. The virtual line extending in the welding line direction D1 via the center axis is the moving axis A67 of the objects 6 and 7 via the center axis CA1. The gas supply holes 230 and 250 are formed so that the moving axis A67 and the second virtual line VL2 are respectively arranged on the same line. In addition, a distance from the gas supply hole 230 to the point A and a distance from the gas supply hole 250 to the point A are the same and are respective second distances L2. Each of the second distances L2 is longer than the each of the first distances L1. Each of the gas supply holes 230 and 250 supplies the gas of a second pressure outward in the radial direction of the arc plasma P1 as shown by dotted line arrows F230 and F250 in FIG. 5. The gas of the second pressure is lower than that of the first pressure. Each of the gas supply holes 230 and 250 correspond to "apart from one pair of gas supply holes, another pair of gas supply holes are provided so as to sandwich the electrode" described in the claims.

In the nozzle 20, the gas suction part 21 suctions the gas supplied from the gas supply part 22 outward in the radial direction of the arc plasma P1. Thereby, a flow of the gas from a radially outer direction of the arc plasma P1 to a radially inner direction of the arc plasma P1 is formed. The flow of the gas is shown by dotted line arrows F22 and F24 in FIG. 4 and dotted line arrows F23 and F25 in FIG. 5. As shown in FIG. 2, a cross-section shape in a vertical direction of the center axis CA1 of the arc plasma P1 produced by the flow of the gas outside in the radial direction of the arc plasma P1, is an elliptic shape. In the arc plasma P1, the elliptic shape has a long side on the second virtual line VL2.

In the arc welding equipment 1 according to the first embodiment, when the objects 6 and 7 are welded, the arc plasma P1 is formed using the arc current. The arc current flows between the electrode 12 and the group of the objects 6 and 7. The flow of the gas from the radially outer direction of the arc plasma P1 to a radially inner direction of the arc plasma P1 is formed using the gas supply part 22 and the gas suction part 21 outside in the radial direction the arc plasma P1. The flow of the gas is shown by the dotted line arrows F22, F23, F24 and F25. In the first embodiment, a shape of the arc plasma P1 may be freely changed using the flow of the gas.

Furthermore, in the arc welding equipment, the gas supply holes 220 and 240 are disposed closer to the electrode 12 than the gas supply holes 230 and 250 are. In addition, each of the gas supply holes 220 and 240 supplies the gas of the first pressure outward in the radial direction of the arc plasma P1. The gas of the first pressure is higher than the gas of the second pressure supplied from each of the gas supply holes 230 and 250. Thereby, as shown in FIG. 4, the arc plasma is compressed in the direction connecting the gas supply hole 220 and the gas supply hole 240. Therefore, in the direction connecting the gas supply hole 220 and the gas supply hole 240, an energy density of the arc plasma P1 may be increased. Accordingly, in the arc welding equipment 1, as shown in FIG. 4, a width of a melting part 67 formed on the part where the objects 6 and 7 contact may be relatively narrowly processed, and a penetration depth of the melting part 67 may be relatively deeply processed.

A direction from the gas supply hole 230 to the gas supply hole 250 is defined as a direction X. A direction from the gas supply hole 220 to the gas supply hole 240 is defined as a direction Y. As shown in FIG. 5, in the shape of the arc plasma P1, the length of the arc plasma in the direction X is larger than that of the arc plasma in the direction Y. Therefore, when the direction of the direction X and that of the moving axis A67 are made equal, the objects 6 and 7 may be welded in the relatively wide range of the objects 6 and 7 in the short time.

In this way, the gas flows from the radially outer direction of the arc plasma P1 to the radially inner direction of the arc plasma P1. Thereby, the arc welding equipment 1 of the first embodiment may weld with a high aspect ratio having a narrow melt width and a deep penetration in the relatively wide range of the objects 6 and 7 in the short time. Thereby, the arc welding equipment may join the objects 6 and 7 at high speed and may reduce a strain of the objects 6 and 7 after being joined.

In addition, the objects 6 and 7 may be joined with a high aspect ratio in a short time using the arc welding equipment 1. Compared to laser welding using expensive equipment, in the arc welding equipment 1, machining cost may be reduced.

In addition, in the arc welding equipment 1, as shown in FIG. 4, the second gas supply holes 222 and 242 becomes closer to the electrode 12 as they approach to the objects 6 and 7. Thereby, the gas passing through the gas supply holes 220 and 240 flows to the radially inner direction of the arc plasma P1, and the length of the arc plasma in the direction Y is even shorter. Therefore, an energy density of the arc plasma may be increased even more. Accordingly, the width of the melting part 67 may be further narrowed, and the penetration depth of the melting part 67 may be made deeper.

Second Embodiment

Next, arc welding equipment of a second embodiment of the present disclosure is described below based on FIGS. 6 and 7. The second embodiment is different from the first embodiment in point having an electrode housing part disposed between a gas suction part and an electrode. It should be appreciated that, in the second embodiment, parts substantially identical with those in the first embodiment are given the same reference numerals, and repeated structures and features thereof will not be described in order to avoid redundant explanation.

Figure 7:
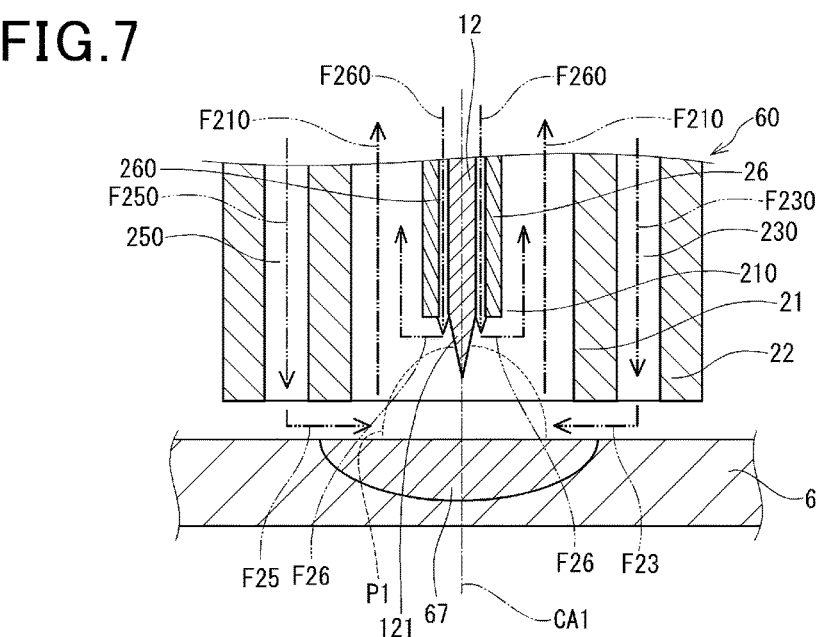
FIG. 7 shows the sectional view of the nozzle provided in the arc welding equipment according to the second embodiment, the sectional view in FIG. 7 being different from the sectional view in FIG. 6.

A sectional view of a nozzle 60 provided in the arc welding equipment in the second embodiment is shown in FIGS. 6 and 7. The nozzle 60 has a gas suction part 21, a gas supply part 22 and an electrode housing part 26.

The electrode housing part 26 is an approximately cylindrical member housing a gas suction hole 210. A housing space 260 is penetrated in the electrode housing part 26 in a center axis CA1 of a nozzle 20. An electrode 12 is housed in the housing space 260. In addition, as shown in dotted line arrow F260 in FIGS. 6 and 7, for example, non-volatile gas such as helium or argon flows toward an arc plasma P1 in the housing space 260. The non-volatile gas flowing from a vicinity of the arc plasma P1 from the housing space 260 is, as shown in a solid line arrow F26 in FIGS. 6 and 7, suctioned to the gas suction hole 210.

In the arc welding equipment according to the second embodiment, the arc plasma P1, which is formed in a vicinity of one end 121 of the electrode 12, is compressed to the objects 6 and 7 by the non-volatile gas. Thereby, an energy density of the arc plasma may be increased even more. Accordingly, the second embodiment has the same effects as in the first embodiment. In addition, in the second embodiment, a width of a melting part 67 may be narrower and a penetration depth of the melting part 67 may be deeper.

In addition, in the arc welding equipment according to the second embodiment, the arc plasma P1 is formed at a position relatively far from one end 121 of the electrode 12 by the non-volatile gas passing toward the arc plasma P1. This may prevent oxidation of the electrode 12 due to the arc plasma P1.

Third Embodiment

Figure 8:
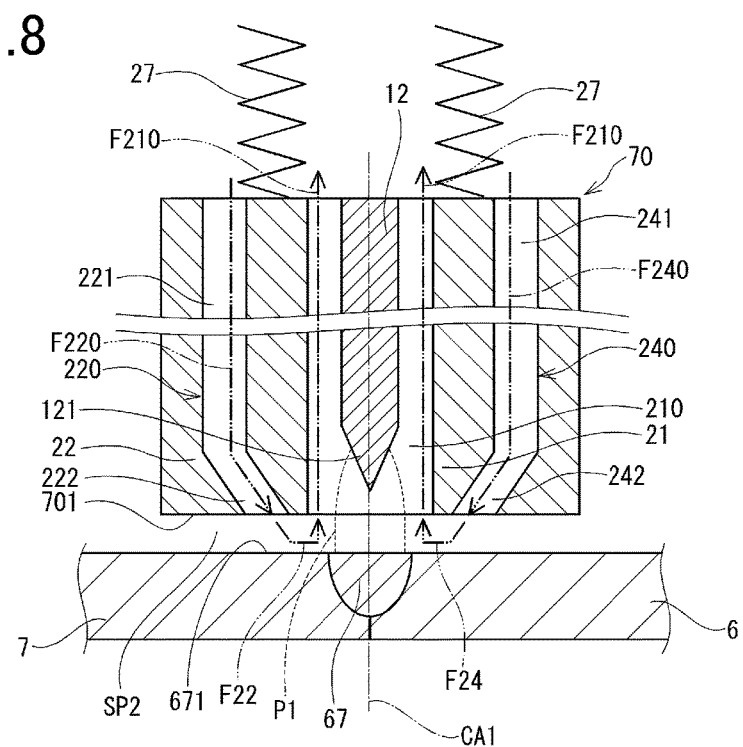
FIG. 8 shows a sectional view of a nozzle provided in arc welding equipment according to a third embodiment of the present disclosure.

Next, arc welding equipment according to a third embodiment of the present disclosure is described below based on FIG. 8. The third embodiment is different from the first embodiment in a point of having an urging means for urging a nozzle. It should be appreciated that, in the third embodiment, parts practically identical with those in the first embodiment are given the same reference numerals, and repeated structures and features thereof will not be described in order to avoid redundant explanation.

In the arc welding equipment according to the third embodiment, a nozzle 70 has a spring 27 as the urging means.

The spring 27 urges a gas suction part 21 and a gas supply part 22 in a direction toward the objects 6 and 7.

In the arc welding equipment according to the third embodiment, when the gas supply part 22 supplies the gas having a prescribed pressure level or more, a gap SP2 is formed. The gap SP2 is formed between an end face 701, of which the gas suction part 21 and the gas supply part 22, and an end face 671 of the objects 6 and 7. The end face 701 is disposed at a side of the objects 6 and 7. The end face 671 is disposed at a side of the gas suction part 21 and the gas supply part 22. When a pressure of the gas supplied to the gap SP2 is larger than an urging force of the spring 27 and constant, a distance between the end face 701 and the end face 671 may be maintained. Therefore, a flow of the gas passing through the gap SP2 may be maintained without being influenced by shapes of the surface of the objects 6 and 7. Thereby, a shape of the arc plasma whose shape is changeable may be maintained using the flow of the gas outside in a radial direction of the nozzle 70. Accordingly, the third embodiment has the same effects as in the first embodiment. In addition, in the third embodiment, a high aspect ratio may be kept.

Other Embodiments

In the above-described embodiments, there are four gas supply holes. However, the number of the gas supply holes is not limited thereto.

In the above-described embodiments, one virtual line connecting one pair of the gas supply holes crosses the other virtual line connecting the other pair of the gas supply holes at right angles on a center axis of a nozzle. However, a position where each of the gas supply holes is formed is not intended to be limited thereby. One virtual line connecting one pair of the gas supply holes does not have to overlap with the other virtual line connecting the other pair of the gas supply holes.

In the above-described embodiments, a gas suction part is formed integrally with a gas supply part. The gas suction part and the gas supply part may be separately formed.

Gas supplied from the gas supply part is supplied from a gas storage part via a power source. However, the gas storage part may supply the gas to the gas supply part not through the power source.

In the above-described embodiments, objects are inserted between an electrode supported by an electrode supporting part and a potential adding unit. Then, the objects are arc welded. However, the electrode and the potential adding unit may be moved relative to the fixed objects, and the objects may be then arc welded.

In the above-described embodiments, polarities of the objects and a polar character of the electrode are different using the potential adding unit. However, the potential adding unit is not necessarily essential. A polar character of an electric power supplied to the electrode may also be different from the polar character of the objects.

The present disclosure is not limited to the above-described embodiments, and various modifications are possible without departing from the scope and spirit thereof.

What is claimed is:

1. A welding equipment for arc welding two objects to be joined comprising:
    an electrode disposed in a vicinity of a part where the two objects contact, an arc plasma being formed between the electrode and the part where the two objects contact;
    a gas supply part disposed radially outside of the electrode, the gas supply part having a plurality of gas supply holes which supply gas to outside in a radial direction of the arc plasma;
    a gas suction part disposed between the gas supply part and the electrode, the gas suction part having a gas suction hole suctioning the gas supplied to outside in the radial direction of the arc plasma using the gas supply part;
    a power supply part which is electrically connected with the electrode, the power supply part supplying electric power to the electrode, polarities of the electric power differ from those of the two objects; and
    a gas storage part that stores gas supplied from the gas supply part to outside in the radial direction of the arc plasma, wherein a pair of the gas supply holes are mounted so that the electrode is disposed therebetween, the pair of the gas supply holes being formed at a position away from the electrode by a first distance, wherein a pair of the gas supply holes are disposed so that the electrode is disposed therebetween other than the other pair of the gas supply holes, the pair of the gas supply holes being formed at a position away from the electrode by a second distance that is longer than the first distance, wherein the pair of the gas supply holes supply the gas of a first pressure outward in the radial direction of the arc plasma, apart from one pair of the gas supply holes, another pair of the gas supply holes are provided so as to sandwich the electrode, the pair of the gas supply holes supply the gas of a second pressure outward in the radial direction of the arc plasma, the second pressure being lower than the first pressure.

2. The welding equipment as set forth in claim 1, wherein a line connecting the pair of the gas supply holes via a point on a center axis of the electrode is a first virtual line;

a line connecting the pair of the gas supply holes via the point on the center axis of the electrode so that the electrode is disposed between the pair of the gas supply holes other than the pair of the gas supply holes is a second virtual line;

the first virtual line orthogonally crosses the second virtual line at the center axis of the electrode; and a cross-section shape of the arc plasma perpendicular to the center axis of the electrode has an elliptic shape, the elliptic shape having a long side on the second virtual line.

3. The welding equipment as set forth in claim 1, wherein the welding equipment further includes an electrode housing part which has a housing space that houses the electrode inside in a radial direction of the gas suction part; and the gas flows toward the arc plasma in the housing space.

4. The welding equipment as set forth in claim 1, wherein the welding equipment further includes an urging means for urging the gas supply part and the gas suction part in a direction toward the two objects;

when the gas supply part supplies the gas having a prescribed pressure level or more outward in the radial direction of the arc plasma;

a gap being formed between an end face and another end face; and the end face of the gas supply part is disposed at a side of the two objects, the other end face of the two objects being disposed at a side of the gas supply part.

5. The welding equipment as set forth in claim 1, wherein the pair of the gas supply holes become closer to the electrode as they reach toward the two objects.

* * * * *